United States Patent
Henriquez

(10) Patent No.: US 6,668,305 B1
(45) Date of Patent: Dec. 23, 2003

(54) METHOD AND APPARATUS FOR THE STAGGERED STARTUP OF HARD DISK DRIVES

(75) Inventor: Glenn A. Henriquez, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 177 days.

(21) Appl. No.: 09/760,963

(22) Filed: Jan. 16, 2001

(51) Int. Cl.[7] .............................................. G06F 13/00
(52) U.S. Cl. ....................... 711/112; 713/330; 713/320; 713/310; 713/2
(58) Field of Search ................................. 713/330, 320, 713/310, 300, 2; 711/112, 114, 111

(56) References Cited

U.S. PATENT DOCUMENTS

| | | | | | |
|---|---|---|---|---|---|
| 4,233,666 | A | * | 11/1980 | Walberg et al. ............. | 318/102 |
| 5,423,046 | A | * | 6/1995 | Nunnelley et al. .......... | 711/114 |
| 5,572,685 | A | * | 11/1996 | Fisher et al. ................. | 710/107 |
| 5,781,719 | A | * | 7/1998 | Hirofuji et al. .............. | 714/14 |
| 5,915,122 | A | * | 6/1999 | Tsurumi ..................... | 711/101 |
| 6,012,124 | A | * | 1/2000 | Kamo et al. .............. | 360/97.03 |
| 6,016,518 | A | * | 1/2000 | Matsushima et al. ....... | 709/208 |
| 6,016,549 | A | * | 1/2000 | Matsushiba et al. .......... | 710/8 |
| 6,233,625 | B1 | * | 5/2001 | Vander Kamp et al. ...... | 710/10 |
| 6,434,697 | B1 | * | 8/2002 | Leyda et al. .................... | 713/2 |

* cited by examiner

Primary Examiner—Hong Kim
(74) Attorney, Agent, or Firm—Blakely, Sokoloff, Taylor & Zafman

(57) ABSTRACT

According to one embodiment, a computer system is disclosed. The computer system includes a first hard disk drive (HDD) and a second HDD. The startup of the first HDD and the second HDD are staggered upon the startup of the computer system.

21 Claims, 3 Drawing Sheets

METHOD AND APPARATUS FOR THE STAGGERED STARTUP OF HARD DISK DRIVES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to powering hard disk drives.

BACKGROUND

A hard disk drive (HDD) is a permanent storage device within a computer system that is used for data and the programs used to create the data. A HDD typically includes individual platters covered on both sides with a magnetic material. An HDD operates by writing small magnetic charges onto the surface of the disk platter. The platters spin at thousands of Revolution per Minute (RPM). Generally, a HDD requires in excess of two amperes (2 A) at 12 Vdc (or a 24 W power input) during the time the disk platter goes from zero RPM to its maximum RPM. The time required for a HDD to reach its maximum speed may take up to three seconds.

Ordinarily, the power supply for the computer system can easily manage the power requirements for starting a single HDD. However, in system applications where multiple HDDs are used, the power supply is typically designed to accommodate the startup of all HDDs at once. For example in a system employing four HDDs, it is necessary for the system power supply to be capable of managing in excess of 96 W (e.g., 24 W×4) of power at 12 Vdc. A power supply that is capable of handling such high power requirements is not cost effective for installation within a computer system. Therefore, a method to reduce the power needed to startup HDDs in a computer system is desired.

SUMMARY

According to one embodiment, a method and apparatus is disclosed for powering up hard disk drives. According to one embodiment, the method includes staggering the startup of hard disk drives (HDDs) in a computer system including a plurality of HDDs.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for starting hard disk drives is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
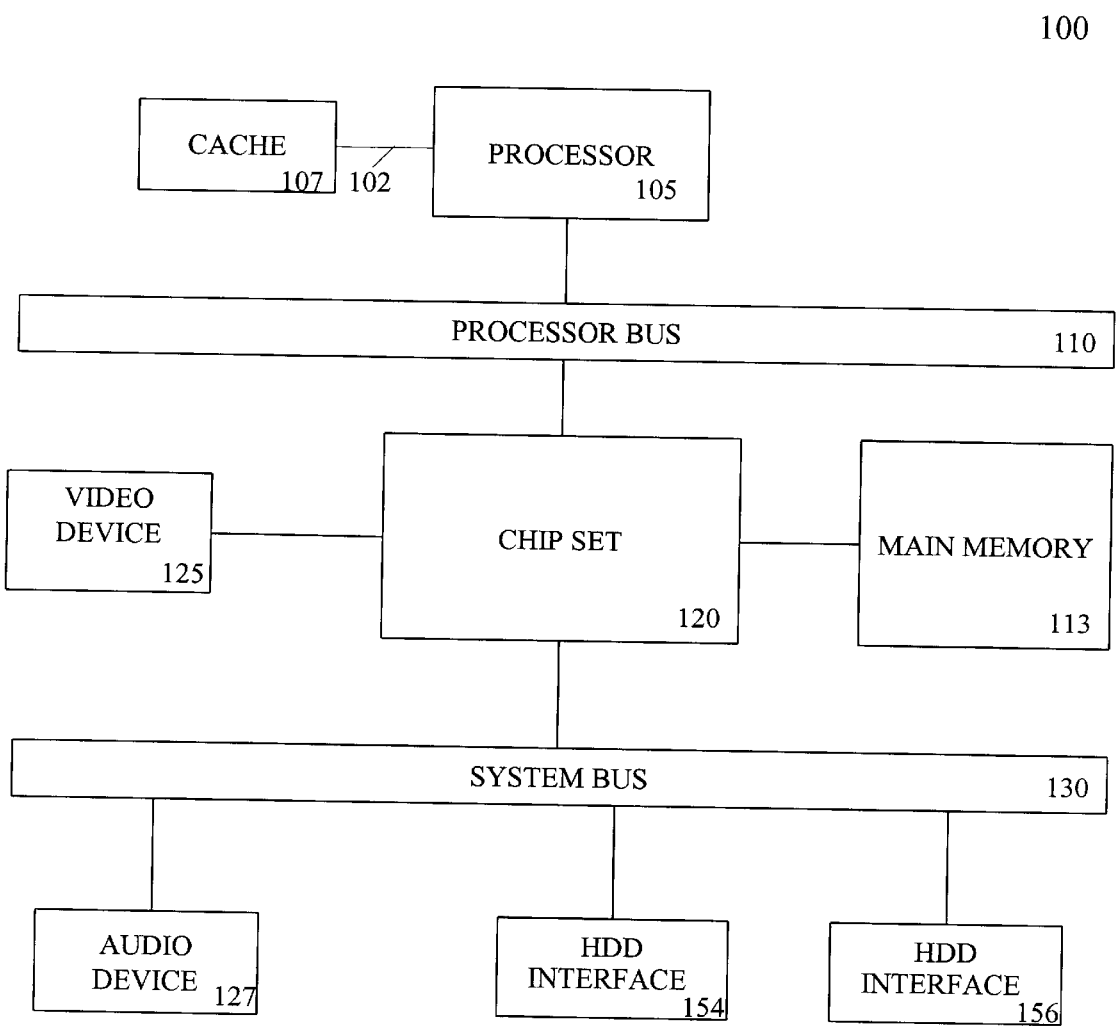
FIG. 1 is a block diagram of one embodiment of a computer system.

FIG. 1 is a block diagram of one embodiment of a computer system 100. According to one embodiment, computer system 100 comprises a server. Computer system 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. One of ordinary skill in the art will appreciate that cache memory 107 is optional and is not required for computer system 100.

Chip set 120 is also coupled to processor bus 110. Chip set 120 may include a memory controller for controlling a main memory 113. Further, chip set 120 may be coupled to a video device 125 that handles video data requests to access main memory 113. In one embodiment, video device 125 includes a video monitor such as a cathode ray tube (CRT) or liquid crystal display (LCD) and necessary support circuitry.

Main memory 113 is coupled to processor bus 110 through chip set 120. Main memory 113 and cache memory 107 store sequences of instructions that are executed by processor 105. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110.

Processor bus 110 is coupled to system bus 130 by chip set 120. In one embodiment, system bus 130 is a Peripheral Component Interconnect (PCI) bus adhering to a Specification Revision 2.1 bus developed by the PCI Special Interest Group of Portland, Oreg.; however, other bus standards may also be used. Multiple devices, such as audio device 127, may be coupled to system bus 130. In addition, hard disk drive (HDD) interface devices (e.g., HDD interface 154 and HDD interface 156) may be coupled to system bus 130. One of ordinary skill in the art will recognize that other quantities of HDD interfaces (e.g., 3, 4, 5, etc.) may be included within computer system 100.

Figure 2:
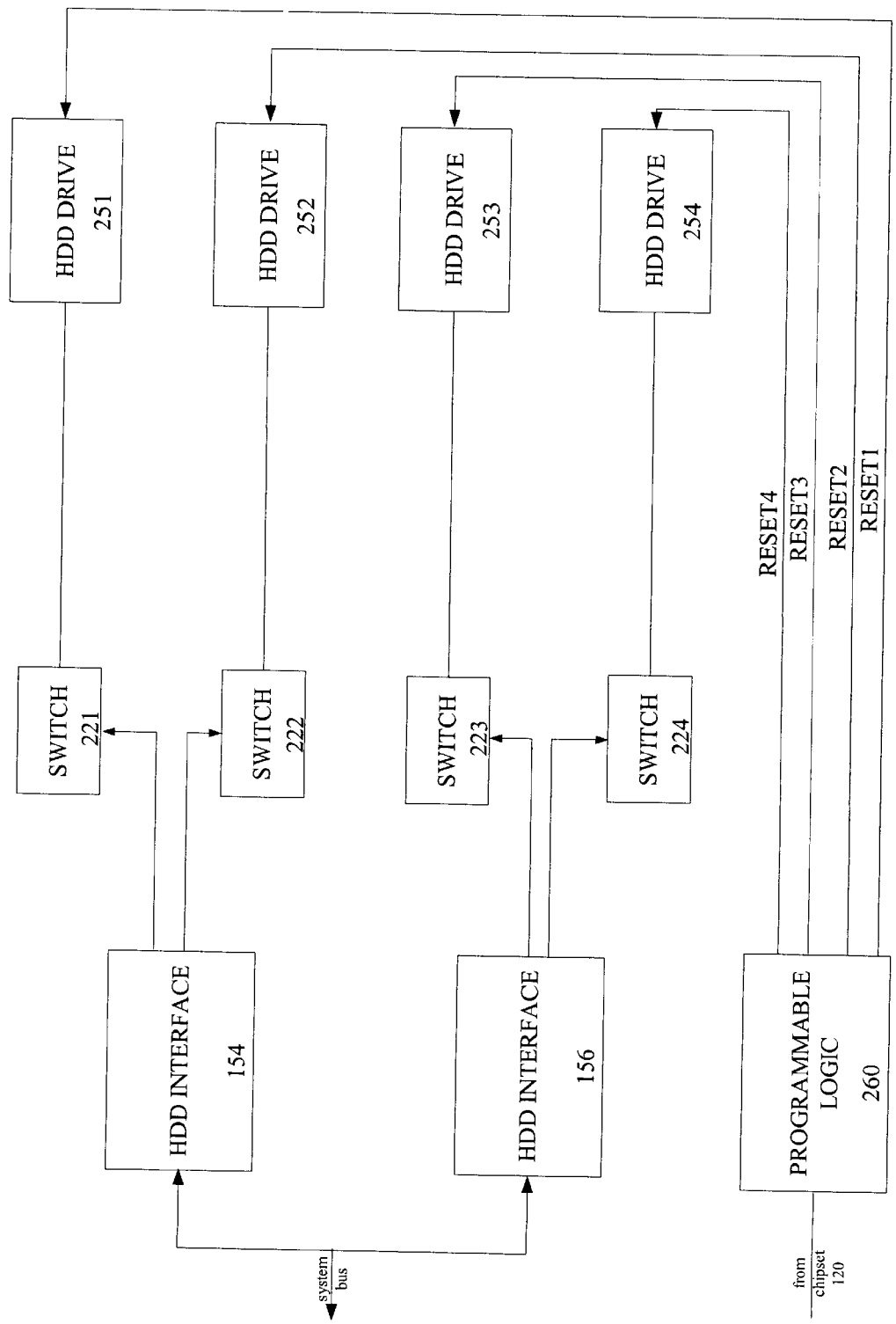
FIG. 2 is a block diagram of one embodiment of interface drivers coupled to hard disk drives.

According to one embodiment, HDD interfaces 154 and 156 provide an interface between signals received in a format transmitted by system bus 130 to the HDD format of computer system 100. In a further embodiment, HDD interfaces 154 and 156 have Integrated Drive Electronics (IDE) interfaces that convert received signals from a PCI configuration to an IDE format. FIG. 2 is a block diagram of one embodiment of HDD interfaces coupled to HDDs 251–254 via switches 221–224. In particular, HDD interface 154 is coupled to switches 221 and 222, which are in turn coupled to HDDs 251 and 252, respectively. Similarly, HDD interface 156 is coupled to switches 223 and 224, which are in turn coupled to HDDs 253 and 254, respectively.

Switches 221–224 provide electrical power from a power supply (not shown) within computer system to each respective HDD drive. According to one embodiment, the switches provide "hot swap" capability that enables the HDD drives to be inserted into (and removed from) computer system 100 without computer system 100 having to be reset. HDDs 251–254 provide permanent storage area within computer system 100 that is used for data and the programs used to create the data. Each HDD includes individual platters covered on both sides with a magnetic material. HDDs 251–254 operate by writing small magnetic charges onto the surface of the disk platter. According to one embodiment, the platters within each HDD spin at thousands of Revolution per Minute (RPM).

According to one embodiment, HDDs 251–254 are IDE drives. IDE drives include controller electronics that are built into the HDD. According to one embodiment, each of HDDs 251–254 require in excess of two amperes (2 A) at 12 Vdc (or a 24 W power input) during the time the disk platter goes from zero RPM to its maximum RPM. Typically, the requisite time for the platters within each HDD to reach its maximum speed is three seconds. Upon computer system 100 startup, each of the HDDs 251–254 are also powered up. However, if HDDs 251–254 are started up simultaneously, the computer system 100 power supply must typically be capable of supplying in excess of 96 W (e.g., 24 W×4) of power at 12 Vdc. As described above, a power supply that is capable of handling such high power requirements is not cost effective for installation within computer system 100.

According to one embodiment, the powering up of HDD drives 251–254 are staggered (or alternated) upon the startup of computer system 100. In order to provide the staggered startup of HDDS 251–254, programmable logic 260 is coupled to chipset 120 and HDD drives 251–254. In one embodiment, programmable logic 260 receives signals from HDD interface 154 and HDD interface 156 via chipset 120 upon system startup. Upon receiving the signals from chipset 120, programmable logic 260 transmits a RESET signal to each of the HDDs 251–254. In particular, programmable logic 260 transmits RESET1–RESET4 signals to HDDs 251–254, respectively. In one embodiment, programmable logic 260 is a field programmable gate array (FPGA). However, one of ordinary skill in the art will appreciate that other programmable devices (e.g., a ROM, PAL, etc.) may be used to implement programmable logic 260.

According to one embodiment, the RESET signal remains at a low logic level when power is initially applied to HDDs 251–254. However, prior to the booting sequence of HDDs 251–254, programmable logic 260 receives the signals from chipset 120. Subsequently, the RESET signals are de-asserted (e.g., transition to a high logic level) one at a time. Once the last RESET signal has been de-activated, the booting sequence will begin. One of ordinary skill in the art will appreciate that the operation of the RESET signals could be reversed. For example, in other embodiments, the RESET signals may begin at a high logic level and later transition to a low logic level.

Figure 3:
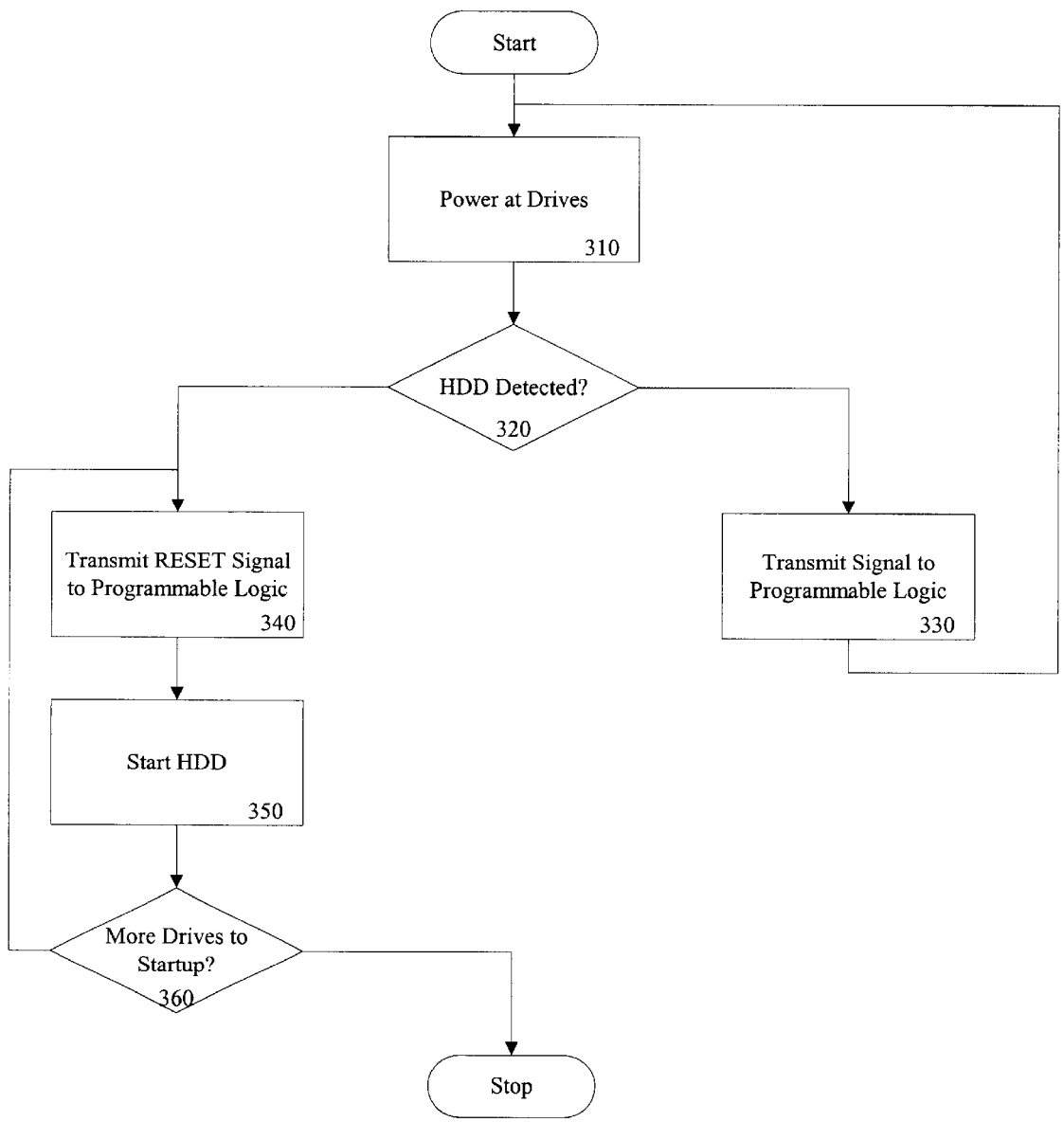
FIG. 3 is a flow diagram of one embodiment for the staggered startup of hard disk drives.

FIG. 3 is a flow diagram of one embodiment for the staggered startup of HDDs 251–254 at an HDD interface. At process block 310, electrical power is received from the computer system 100 power supply (not shown) at HDDs 251–254. As described above, a platter within an HDD will not immediately begin the spinning cycle upon being powered up. The spinning cycle will not begin as long as the RESET signal received from programmable logic 260 is asserted. At process block 320, it is determined whether an HDD is detected at an HDD interface. If an HDD is detected, a signal is transmitted to programmable logic 260 at process block 330. After the signal is transmitted to programmable logic 260, control is returned to process block 320 where it is determined whether another HDD is detected. If so, control is returned to process block 330 where another signal is transmitted to programmable logic 260.

The progression through process blocks 320 and 330 continues until all of the HDDs connected to the HDD interface has been detected. Note that in other embodiments, the HDD interface may detect all of the connected HDDs before transmitting a signal to programmable logic 260. In such an embodiment, an encoded signal is transmitted to programmable logic 260 indicating which devices are connected. Note that the process blocks described (e.g., process blocks 310–330) above are implemented at each of the HDD interfaces 154 and 156.

If it is determined that another HDD has not been detected at the HDD interface, programmable logic 260 de-asserts a RESET signal to the first indicated HDD, process block 340. At process block 350, the platter within the HDD begins spinning. At process block 360, it is determined whether there is another HDD in which a RESET signal is to be de-asserted. If another RESET signal is to be de-asserted, control is returned to process block 340 where programmable logic 260 de-asserts a RESET signal to the next indicated HDD. Subsequently, control is returned to process block 350 where the platter within the next HDD begins spinning. According to one embodiment, the delay between activation of each HDD is four seconds. However, one of ordinary skill in the art will recognize that other delays may be implemented. The progression through process blocks 320 and 3340–360 continues until all of the RESET signals for detected devices have been de-asserted.

Staggering each HDD in computer system 100 helps to reduce the total power needed during the startup spinning cycle for all HDDs in computer system 100. Reducing the power makes it possible for computer system 100 to use a more cost effective power supply. Moreover, less power consumed by HDD startup results in other components within computer system being able to share the same power outlet.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Thus, a method to reduce the power needed to startup HDDs in a computer system has been described.

What is claimed is:

1. A method comprising:
receiving a signal at programmable logic indicating that a computer system has been powered up;
detecting a first Hard Disk Drive (HDD) at a HDD interface;
transmitting a first signal from the HDD interface to the programmable logic to indicate the detection of the first HDD;
transmitting a first reset signal from the programmable logic to the first HDD; and
starting the first HDD in response to receiving the first reset signal.

2. The method of claim 1 further comprising:
detecting a second HDD at the HDD interface;
transmitting a second signal from the HDD interface to the programmable logic to indicate the detection of the second HDD;
transmitting a second reset signal from the programmable logic to the second HDD; and
starting the second HDD.

3. The method of claim 2 wherein the starting of the second HDD is staggered a predetermined interval after the starting of the first HDD.

4. The method of claim 2 wherein the first and second reset signals are transmitted simultaneously from the programmable logic to the first and second HDDs as an encoded signal.

5. The method of claim 2 wherein the first and second HDDs are Integrated Drive Electronics (IDE) drives.

6. The method of claim 2 wherein the HDD interface is an IDE interface.

7. The method of claim 2 further comprising:
detecting a third HDD at a second HDD interface;
transmitting a first signal from the second HDD interface to the programmable logic to indicate the detection of the third HDD;
transmitting a third reset signal from the second HDD interface to the third HDD;
starting the third HDD;
detecting a fourth HDD at the second HDD interface;
transmitting a second signal from the second HDD interface to the programmable logic to indicate the detection of the fourth HDD;
transmitting a fourth reset signal from the programmable logic to the fourth HDD; and
starting the fourth HDD.

8. A computer system comprising:
a first hard disk drive (HDD);
a second HDD;
a first HDD interface coupled to the first HDD and the second HDD to detect the presence of the first HDD and the second HDD; and
programmable logic coupled to the first HDD, the second HDD, and the first HDD interface to receive a signal indicating that a computer system has been powered up, to receive a second signal from the HDD interface indicating the detection of the first HDD and the second HDD, and to transmit reset signals to the first HDD and the second HDD in order to initiate the startup of the first HDD and the second HDD, wherein the starting of the second HDD is staggered a predetermined interval after the starting of the first HDD.

9. The computer system of claim 8 further comprising control circuitry, coupled to the first HDD interface, to transmit signals to the programmable logic upon the first HDD and the second HDD being detected.

10. The computer system of claim 9 wherein the control circuitry comprises a chipset.

11. The computer system of claim 8 further comprising:
a third hard disk drive (HDD) coupled to the programmable logic;
a fourth hard disk drive (HDD) coupled to the programmable logic; and
a second HDD interface coupled to the third HDD and the fourth HDD to detect the presence of the third HDD and the fourth HDD.

12. The computer system of claim 11 further comprising:
a first switch coupled to the first HDD interface and the first HDD; and
a second switch coupled to the first HDD interface and the second HDD.

13. The computer system of claim 12 further comprising:
a third switch coupled to the second HDD interface; and
a fourth switch coupled to the second HDD interface.

14. The computer system of claim 8 wherein the programmable logic transmits reset signals to the third HDD and the fourth HDD in order to initiate the startup of the third HDD and the fourth HDD.

15. The computer system of claim 14 wherein the first, second, third and fourth reset signals are transmitted simultaneously from the programmable logic to the first second, third and fourth HDDs as an encoded signal.

16. The computer system of claim 15 wherein the programmable logic transmits a second reset signal to the second HDD after transmitting a first reset signal to the first HDD.

17. The computer system of claim 16 wherein the programmable logic transmits a third reset signal to the third HDD after transmitting the second reset signal to the second HDD.

18. The computer system of claim 16 wherein the second reset signal is transmitted four seconds after the first reset signal.

19. The computer system of claim 8 wherein the first and second HDDs are Integrated Drive Electronics (IDE) drives.

20. The computer system of claim 8 wherein the programmable logic is a field programmable gate array (FPGA).

21. The computer system of claim 8 wherein the programmable logic is a read only memory (ROM).

* * * * *